United States Patent [19]

Fujikawa et al.

[11] Patent Number: 4,895,390

[45] Date of Patent: Jan. 23, 1990

[54] STEERING MOUNTING ARRANGEMENT FOR AUTOMOTIVE VEHICLE FEATURING IMPROVED HEAD ON COLLISION CHARACTERISTICS

[75] Inventors: Tadahiro Fujikawa, Hiratsuka; Takashi Tamura, Fujisawa, both of Japan

[73] Assignee: Nissan Shatai Company, Limited, Kanagawa, Japan

[21] Appl. No.: 245,505

[22] Filed: Sep. 19, 1988

[30] Foreign Application Priority Data

Apr. 4, 1988 [JP] Japan .................................. 63-82797

[51] Int. Cl.⁴ ............................................ B62D 1/18
[52] U.S. Cl. ....................................... 280/777; 74/492
[58] Field of Search .................. 74/492; 280/777, 779, 280/780

[56] References Cited

U.S. PATENT DOCUMENTS 4,452,096 6/1984 Workman ............................ 280/777
4,718,296 1/1988 Hyodo ................................. 280/777
4,746,144 5/1988 Kulczyk ............................... 280/777

Primary Examiner—Richard A. Bertsch
Attorney, Agent, or Firm—Bachman & LaPointe

[57] ABSTRACT

In order to move a steering wheel about a large radius to a safe position during a head on collision or the like, the steering column is supported on a first stay which is resistant to bending and which is connected to the dashpanel which separates the engine room and the passenger compartment, at a level lower than the center of the steering wheel. A second stay is connected to the first in a manner which defines a triangular arrangement which, when the dashpanel is deformed, tends to rotate about the location the first stay is connected to the dashpanel. The upper end of the first stay is detachably connected to the structural panels of the vehicle by a "snap off" type releasably connection which permits the bracket to move vertically upon the application of a force in excess of the predetermined magnitude.

6 Claims, 4 Drawing Sheets

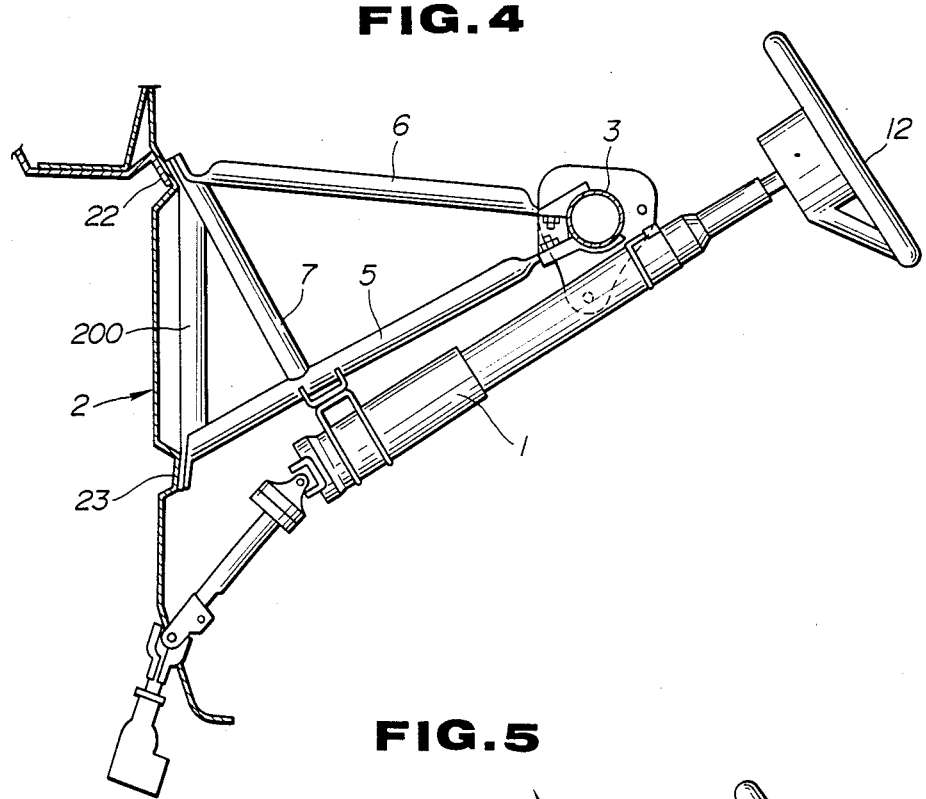
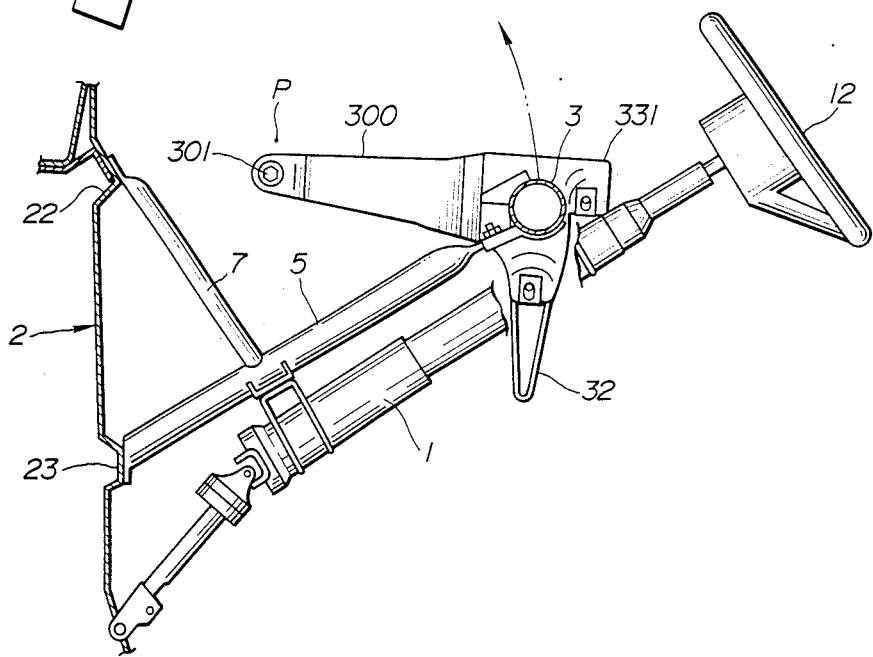

STEERING MOUNTING ARRANGEMENT FOR AUTOMOTIVE VEHICLE FEATURING IMPROVED HEAD ON COLLISION CHARACTERISTICS

BACKGROUND OF THE INVENTION

1. Field of the Invention

The present invention relates to a steering column arrangement for an automotive vehicle and more specifically to a steering column arrangement which induces the steering column to move to a desirable position and orientation in the event of a severe head on collision.

2. Description of the Prior Art

JP-M-62-117169 discloses an arrangement wherein a steering column is supported on a dash panel disposed between the engine compartment and the passenger compartment in a manner which prevents the steering wheel from being driven back through the passenger compartment toward and/or into the driver. This arrangement has included a structure which permits the column to be rotated about a hinge like arrangement which is supported on a mounting member which extends laterally across the vehicle.

However, this arrangement has encountered the drawback that upon a head on collision, the radius about which the steering wheel is pivotal is limited with the result that the amount of movement of wheel away from zone toward which the drivers head tends to enter during the collision is insufficient to assure passenger safety. Moreover, the amount of movement the wheel undergoes normally reduces as the bulkhead and other panels located between the engine compartment and the passenger compartment deform under the influence of the engine being forced rearwardly by the collision.

SUMMARY OF THE INVENTION

It is an object of the present invention to provide a steering support arrangement for an automotive vehicle or the like which moves the steering wheel to a safe position in the event of a severe head on collision.

In brief, the above object is achieved by an arrangement wherein the steering column is supported on a first stay which is resistant to bending and which is connected to the dashpanel which separates the engine room and the passenger compartment, at a level lower than the center of the steering wheel. A second stay is connected to the first in a manner which defines a triangular arrangement which, when the dashpanel is deformed, tends to rotate about the location the first stay is connected to the dashpanel.

The upper end of the first stay is detachably connected to the structural panels of the vehicle by a "snap off" type releasable connection which permits the bracket to move vertically upon the application of a force in excess of the predetermined magnitude.

More specifically, the present invention is deemed to comprise a steering mounting arrangement for a vehicle having an engine room and a passenger compartment which are separated by a first panel, the arrangement featuring: a mount member which supports a steering column, the steering column housing a steering shaft, the steering shaft having a steering wheel at one end and a steering gear operatively connected at the other end; a connection arrangement which interconnects the mount member to a second panel of the vehicle, the connection arrangement being designed to release the mount member and permit it to be moved upwardly in response to a the application of a force in excess of a predetermined magnitude in the direction; a first stay which extends between the mount member and a site located on the first panel at a level lower than the mount member, the first stay being arranged to be resistant to bending forces; and a member which is connected to the first panel and one of the first stay and the mount member and which exerts a tractive force which induces the mount member to pivot about a center located at the site.

BRIEF DESCRIPTION OF THE DRAWINGS

The attendant features and advantages of the present invention will become more clearly appreciated from the following description taken in conjunction with the appended drawings in which:

FIG. 4 is a side elevation showing a second embodiment of the present invention; and FIGS. 5, 6 and 7 are side elevations showing third, fourth and fifth embodiments of the present invention.

DESCRIPTION OF THE PREFERRED EMBODIMENTS

Figure 1:
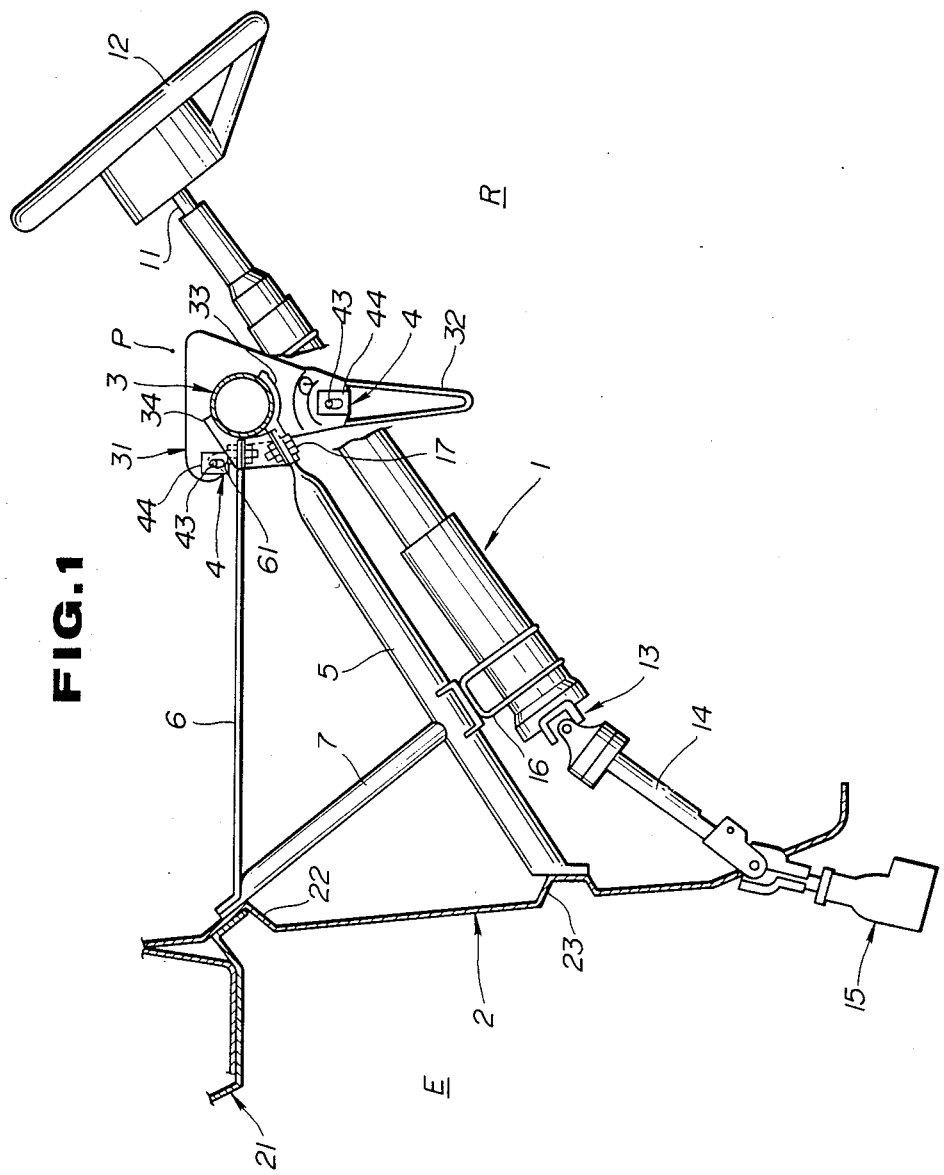
FIG. 1 is an side elevational view of an arrangement which characterizes a first embodiment of the present invention.
Figure 2:
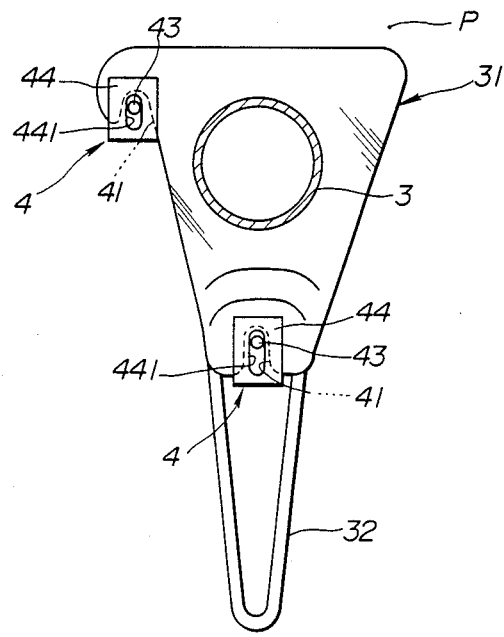
FIG. 2 is an elevational view of a portion of the arrangement which characterizes the first embodiment and which forms a vital part thereof.
Figure 3:
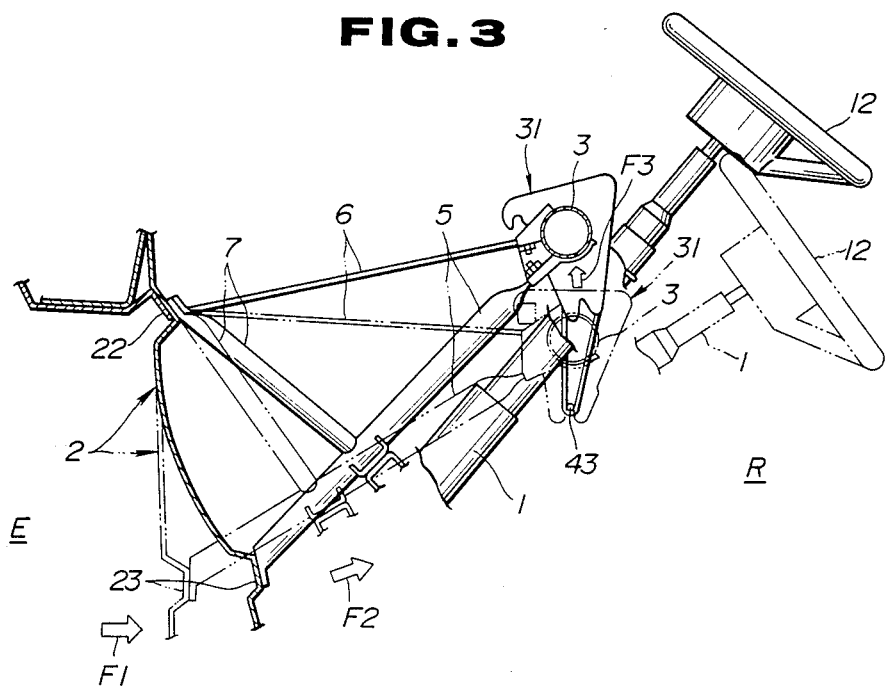
FIG. 3 is a drawing showing the change in position of the steering wheel which occurs during a severe head on collision.

FIGS. 1 to 3 show a first embodiment of present invention.

In this arrangement a steering column 1 houses and rotatably supports a steering shaft 11. A steering wheel 12 is secured to the upper end of the steering shaft 11 in a conventional manner. A universal joint 13 provides an operative connection between the lower end of the steering shaft and an intermediate shaft 14. This intermediate shaft 14 is arranged to pass through an aperture formed in the dashpanel 2 which separates the engine room E and the passenger compartment R, and establish an operative connection with a steering gear 15.

The dashpanel 2 is formed with a flange portion 22 along the upper edge thereof. This flange 22 cooperates with other panels which define an air box and the like structures. The dashpanel 2 is further formed with a second rib-like projection 23 which extends across the panel in the illustrated position.

The steering column 1 is supported by a mount member 3. That is to say, as shown in FIG. 1, the mount member 3 is provided with a lower bracket 33 which is secured thereto by way of bolt 17. The mount member 3 is operatively connected at its both ends with panels P which define the side walls of the vehicle chassis by way of brackets 31. In the drawings only the right hand side bracket 31 is shown.

FIG. 2 is a side elevation of one of the brackets 31. This bracket is provided with selectively detachable connection devices 4. In the instant embodiment the only the right hand side bracket (viz., the bracket closest the steering column) is provided with the selectively detachable connection devices 4.

The bracket 31 is formed with two cut-out sections 41 and 42. In this embodiment the cut-outs are arranged to receive bolts 43. These bolts 43 are secured to the panel P by unillustrated nuts and are arranged to project therefrom. Clip-like slider members 44 are arranged to cooperate with the sections of the bracket 31 in which the cut-outs 41 and 42 are formed. The sliders 44 are arranged to fit snugly against the bracket 31 and are formed with elongate through holes 441 in which the bolts 43 are received. When a force of a predetermined magnitude is applied to the bracket which tends to move the same vertically the bracket 31 is pulled out of the sliders 44 in a manner which will be set forth in more detail hereinlater.

The bracket 31 is further formed with a stopper ring 32 which is connected to the lower end of thereof. This ring 32 is arranged to catch the lower of the two bolts 43 and limit the amount by which the bracket 31 can be displaced vertically in the event of a head on collision.

The steering column 1 is, as shown in FIG. 1, is supported by a lower stay 5. This lower stay 5 is provided in a manner to be responsive to the deformation of dashpanel 2 caused by the engine and associated apparatus (such as the steering gear) being driven rearwardly toward the passenger compartment. In this embodiment the lower stay 5 comprises a tubular pipe member which is formed with flattened ends. The upper end of the stay is fixedly connected to the mount member 3 by way of a bracket while the lower end is fixedly connected to the rib-like projection formed in the dashpanel 2. As will be appreciated from FIG. 1 the steering column is arranged to be essentially parallel with the lower stay 5 and supported thereby by way of a bracket 16.

The lower stay 5 in this arrangement is such as to be sufficiently rigid as not to bend during a collision and the application of powerful deforming forces and thus able to support the steering column at all times.

The lower stay 5 is connected with an upper stay 6 and an intermediate stay 7 in a manner to define a triangular truss. In this arrangement the upper stay 6 is connected to the mount member through an upper bracket 34 which is secured thereto by a bolt 61. The forward end of the upper stay 6 is connected to the rib-like projection 22 which is formed at the upper edge of the dashpanel 2. As will be noted the upper end of the intermediate stay 7 is also connected to the rib-like projection 22 at the same position as the upper stay 6. The connection of course can be made by means of a bolt-nut engagement or the like. The lower end of the stay 7 is connected to the lower stay proximate the location bracket 16.

The upper stay 6 is arranged to exhibit considerable tensile strength while being arranged to be easily bent. Accordingly, this member can be formed of a flat member having an elongate rectangular cross-section. Although not shown, the triangular arrangement is further reinforced by members which add to the rigidity of the arrangement. However, for the sake of drawing clarity these members have been omitted.

As the upper, lower and intermediate stays 6, 5 and 7 define a triangular truss which is arranged in the illustrated manner. In the practical construction, the stays 5 and 7 may be formed by means of pipe members. The steering column is supported in a manner which strongly resists downward movement and which permits the upward movement thereof upon sufficient force being applied.

In operation the above described arrangement is such that, as shown in FIG. 3, upon a head on collision a force F1 is applied to the dashpanel in manner which deforms the same from the phantom line configuration to that shown in solid line. The force F1 is of course caused by the engine, transaxle or other type of transmission, and steering gear 15 being forced rearwardly. As the lower stay is angled upwardly, this deformation induces the force F1 which acts on the the lower stay 5 through the dashpanel to change direction and produce a force F2 which acts at an upwardly inclined angle as shown. However, as the lower stay 5 is highly resistant to bending type deformation by forces which act in this direction, and the upper stay 6 exhibits high tensile strength, the ends of the upper and intermediate stays 6 and 7 which are secured to the upper rib-like projection 22 tend to bend and/or induce the section of the projection 22 to which they are attached, to bend in a manner wherein the the triangular truss tends to rotate as a whole about a center of rotation located at the point the lower stay 5 is connected the rib-like projection 23. This our course induces the bracket 31 to pull out of the selectively detachable connection devices 4 and permit the steering column to be drawn up to the position shown in solid line.

During the detachment of the selectively detachable connection devices 4, as the bracket 31 is initially moved up under the influence of the rotation of the triangular truss arrangement, the bolts 43 move down through the cut outs formed in the bracket 31 and the elongate openings 441 formed in the sliders 44. When the bolts 43 engage the bottom of the openings 441 the bracket 31 pulls out of the clip like sliders 44 and is temporarily released to freely move in the vertical direction.

However, after a predetermined amount of travel the lower bolt 43 engages the bottom of the stopper ring 32 and movement in excess of that required from the view point of safety is resisted.

It should be noted that the function of a knee protector (not shown) which is connected with the mount member 3 is improved by the fact that the upper stay 6 exhibits relatively easily bendable characteristics tends to allow the above mentioned type of rotation in response to the application of force against the knee protector by the the lower appendages of the passenger or passengers and thus enables the amount damage to legs and knees of the vehicle passengers seated in the front seats to be reduced.

With this above described embodiment, as the triangular truss arrangement is pivotal about the point at which the lower stay 5 is connected to the rib-like projection 23, the radius about which the steering wheel is rotated in accordance with the present invention is much larger than in the case of the prior art discussed hereinbefore. This of course enables the steering wheel to moved sufficiently to ensure the safety of the driver in the case of a severe collision which deforms the front of the vehicle in the aforementioned manner.

Further, as the point about which the truss arrangement is pivotal, the triangular truss is assuredly rotated in the desired direction and thus ensures that the steering wheel is positively induced to move in the illustrated manner FIG. 4 shows a second embodiment of the present invention. In this arrangement the triangular truss formation comprised of the upper lower and intermediate stays 6, 5 and 7 is combined with a fourth front stay 200. Alternatively, in lieu of providing this additional stay it is within the scope of the present invention to directly reinforce the dashpanel 2 in a manner which provided the same vertical re-enforcing effect.

FIG. 5 shows a third embodiment of the present invention. In this arrangement a connection member 300 is formed integrally with a bracket 331 and arranged to be pivotal about a bolt 301 which projects from the side panel P. The bolt is arranged between the dashpanel 2 and the mount member 3.

Accordingly, in the event of a head on collision, as the lower stay 5 is driven forward in response to the deformation of the lower section of the dashpanel 2 the mount member 3 is induced to rotate about a radius the center of which is concentric with the axis of the bolt 301. This arrangement of course provides essentially the same effect as the first embodiment.

Figure 6:
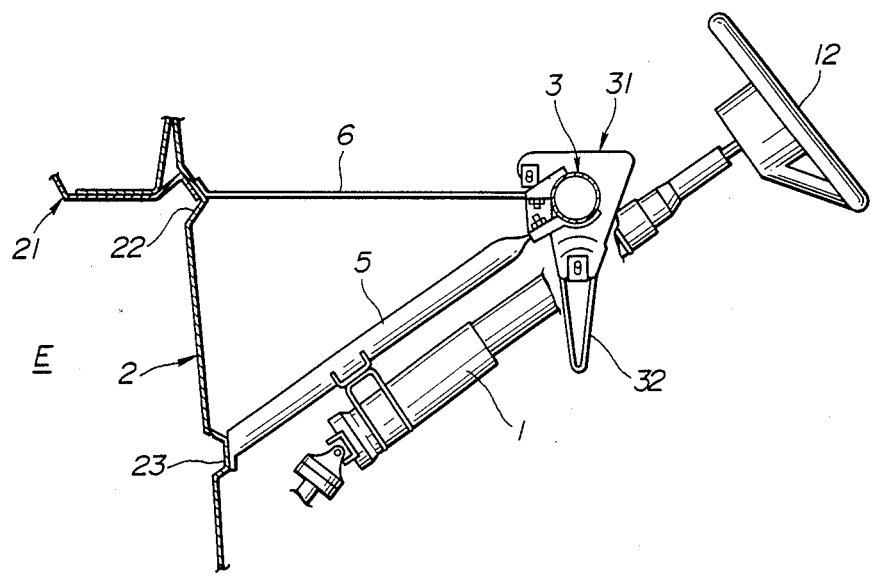

FIG. 6 shows a fourth embodiment of the present invention. This arrangement is characterized in that the intermediate stay 7 is omitted from the arrangement. However, as triangulation is provided by the arrangement of lower stay 5, upper stay 6 and the section of the dashpanel which extends between the rib-like projections 22 and 23, essentially the same effect as provided by the first embodiment is also provided in this instance.

Figure 7:
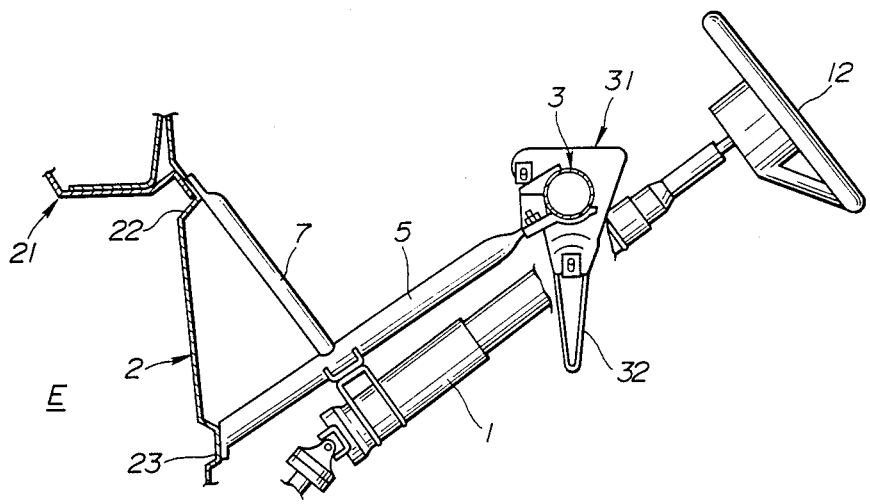

FIG. 7 shows a fifth embodiment of the present invention. In this arrangement the upper stay 6 is omitted. However, a triangulation effect is still provided by the combination of the lower stay 5 and the intermediate stay 7. During a head on collision the lower stay 5 tends to swing about the intermediate stay and thus induce essentially the same operational characteristics as achieved with the preceeding embodiments.

What is claimed is:

1. A mounting mechanism for mounting a steering column in a vehicle having an engine room and a passenger compartment which are separated by a first panel such that said steering column is pivotably displaced to a safe position in the event of a severe head on collision comprising:

a mount member which supports a steering column, said steering column housing a steering shaft, said steering shaft having a steering wheel at one end and a steering gear operatively connected at the other end;

a connection arrangement which interconnects said mount member to a second panel of said vehicle, said connection arrangement being designed to release said mount member and permit it to be pivotably displaced to a safe position and with it the steering column in response to the application of a force in excess of a predetermined magnitude caused by a head on collision;

a first stay which extends between said mount member and a first site located on said first panel at a level lower than said mount member, said first stay being arranged to be resistant to bending forces; and a member which is connected to said first panel at a second site above said first site and one of said first stay and said mount member so as to form therewith a triangular truss wherein said member exerts a tractive force which induces said mount member and steering column to pivot about at said first site to a safe position.

2. A vehicle as claimed in claim 1 wherein said first panel comprises a dash panel which extends laterally across the vehicle and said second panel comprises a structural panel extends in the longitudinal direction of said vehicle.

3. A vehicle as claimed in claim 1, wherein said connection arrangement comprises:

a bracket; and a slider member, said slider member being arranged to snugly clamp against said bracket in a manner which requires force in excess of a predetermined magnitude to pull said slider off said bracket, said slider member being operatively connected with said second panel.

4. A vehicle as claimed in claim 3 wherein said connection arrangement further comprises:

a ring, said ring being attached to said bracket and arranged to engage a projection which extends from said second panel when said bracket detaches from said slider and moves upwardly by a predetermined amount.

5. A vehicle as claimed in claim 1 wherein said member comprises an upper stay, said upper stay being arranged to exhibit high tensile strength and to be relatively easily distorted by bending forces.

6. A vehicle as claimed in claim 1 wherein said member comprises an intermediate stay, said intermediate stay being connected to said first panel at level above said site and to interconnect with said first stay at a location between its upper and lower ends.

* * * * *